US012789307B2

(12) United States Patent
Murata et al.

(10) Patent No.: US 12,789,307 B2
(45) Date of Patent: Nov. 10, 2026

(54) TOOL MAGAZINE DEVICE

(71) Applicant: DMG MORI CO., LTD., Nara (JP)

(72) Inventors: Masaki Murata, Nara (JP); Hiroaki Nishida, Nara (JP)

(73) Assignee: DMG MORI CO., LTD., Nara (JP)

( * ) Notice: Subject to any disclaimer, the term of this patent is extended or adjusted under 35 U.S.C. 154(b) by 277 days.

(21) Appl. No.: 18/422,508

(22) Filed: Jan. 25, 2024

(65) Prior Publication Data

US 2024/0238925 A1 Jul. 18, 2024

Related U.S. Application Data

(63) Continuation of application No. PCT/JP2022/030218, filed on Aug. 8, 2022.

(30) Foreign Application Priority Data

Aug. 18, 2021 (JP) ................................ 2021-133580

(51) Int. Cl.
*B23Q 3/155* (2006.01)

(52) U.S. Cl.
CPC ................................ *B23Q 3/15526* (2013.01)

(58) Field of Classification Search
CPC ............ B23Q 3/15526; B23Q 3/15722; B23Q 11/0053; B23Q 11/0057; B23Q 11/08; B23Q 11/0067; B23Q 2003/15532; Y02P 70/10
See application file for complete search history.

(56) References Cited

U.S. PATENT DOCUMENTS

| | | | | |
|---|---|---|---|---|
| 5,542,899 A * | 8/1996 | Yamada | B23Q 3/15793 483/66 |
| 2005/0032615 A1* | 2/2005 | Sato | B23Q 3/15534 483/39 |
| 2021/0086319 A1 | 3/2021 | Amann | |

FOREIGN PATENT DOCUMENTS

| | | |
|---|---|---|
| CN | 212145538 U | 12/2020 |
| JP | 2001025933 A | 1/2001 |
| JP | 2001225239 A | 8/2001 |
| JP | 2006136984 A | 6/2006 |
| JP | 2020199570 A | 12/2020 |

OTHER PUBLICATIONS

International Search Report dated Aug. 25, 2022, International Application No. PCT/JP2022/030218, 9 pages.

* cited by examiner

*Primary Examiner* — Moshe Wilensky
(74) *Attorney, Agent, or Firm* — Stinson LLP

(57) ABSTRACT

A tool magazine device including: a tool transport unit in which a plurality of tool pots are disposed at predetermined intervals on the outer periphery of the tool transport unit and which is configured to circulate and transport each tool pot along a trajectory that circulates in up-and-down direction; and a chip guide disposed along a tip trajectory of a tool held in the tool pots and including a guide surface that receives and guides chips separated from the tool. According to the tool magazine device, chips and the like fallen from the tool held in the tool pots can be easily collected.

7 Claims, 7 Drawing Sheets

TOOL MAGAZINE DEVICE

CROSS REFERENCE TO RELATED APPLICATION

The present application is a continuation application of International Application No. PCT/JP2022/030218, filed on Aug. 8, 2022. The contents of this application are incorporated herein by reference in their entirety.

TECHNICAL FIELD

The present invention relates to a tool magazine device.

BACKGROUND

NC (Numerical Control) machine tools are equipped with an automatic tool changer (ATC) that automates tool changing with respect to the spindle, in order to reduce the time required for tool changing.

The automatic tool changer includes a tool magazine equipped with a tool transport unit in which a plurality of tool pots capable of inserting and removing a tool thereinto and therefrom are disposed at predetermined intervals around the outer periphery of the unit and which is configured to circulate and transport each tool pot along a predetermined annular trajectory. The automatic tool changer further includes a tool change arm that replaces the tool attached to the spindle, with a tool circulated and transported by the tool transport unit to a preset tool changing position with respect to the spindle.

Patent Literature 1 (JP2006-136984A) discloses a machine tool intended to prevent various malfunctions caused by accumulation of chips fallen on the bottom of a magazine cover from a tool magazine that holds a tool and rotates in a circular manner.

The above machine tool includes, on part of the bottom plate of a magazine cover accommodating a tool magazine therein, a discharge port communicated with a machining region below the bottom plate, and a slope inclined downward toward the discharge port, and configured such that chips fallen from the tool magazine are collected directly at the discharge port or are guided by the slope and collected at the discharge port, and through this discharge port, discharged into the machining region covered with a splash cover.

SUMMARY

In large machine tools, however, the types and the number of tools to be changed are increased. Accordingly, the size of tool transport unit is increased, in which the tool transport unit is configured to circulate and transport each tool pot along an annular trajectory that circulates in up-and-down direction. Therefore, it has been difficult to secure, in the bottom of the magazine cover, a space for providing a slope or a discharge port for discharging chips separated from the tool into the machining region, as disclosed in Patent Literature 1.

One possible solution would be to install a tool magazine on one side of the machining region covered with the splash cover, and provide the magazine cover covering the tool magazine with a door for collecting chips separated and fallen from the tool.

However, it is a complicated work to insert a cleaning tool through a very narrow space which becomes accessible by keeping the door open, to collect the chips fallen and accumulated on the floor. Especially when a plurality of tool transport units are installed side by side, the cleaning work itself becomes difficult.

An objective of the present invention is to provide a tool magazine device in which chips and the like separated from a tool stored in a tool magazine can be easily collected.

A tool magazine device according to the present invention is characterized by including: a tool transport unit in which a plurality of tool pots are disposed at predetermined intervals and which is configured to circulate and transport each tool pot: a chip guide including a guide surface that receives and guides chips separated from a tool: a chip container provided adjacent to the chip guide; and a cleaner that leads the chips into the chip container along the guide surface, in conjunction with the circulating and transporting of each tool pot by the tool transport unit.

According to the present invention, it is possible to provide a tool magazine device that can easily collect chips and the like fallen from a tool stored in a tool magazine.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION

Figure 1:
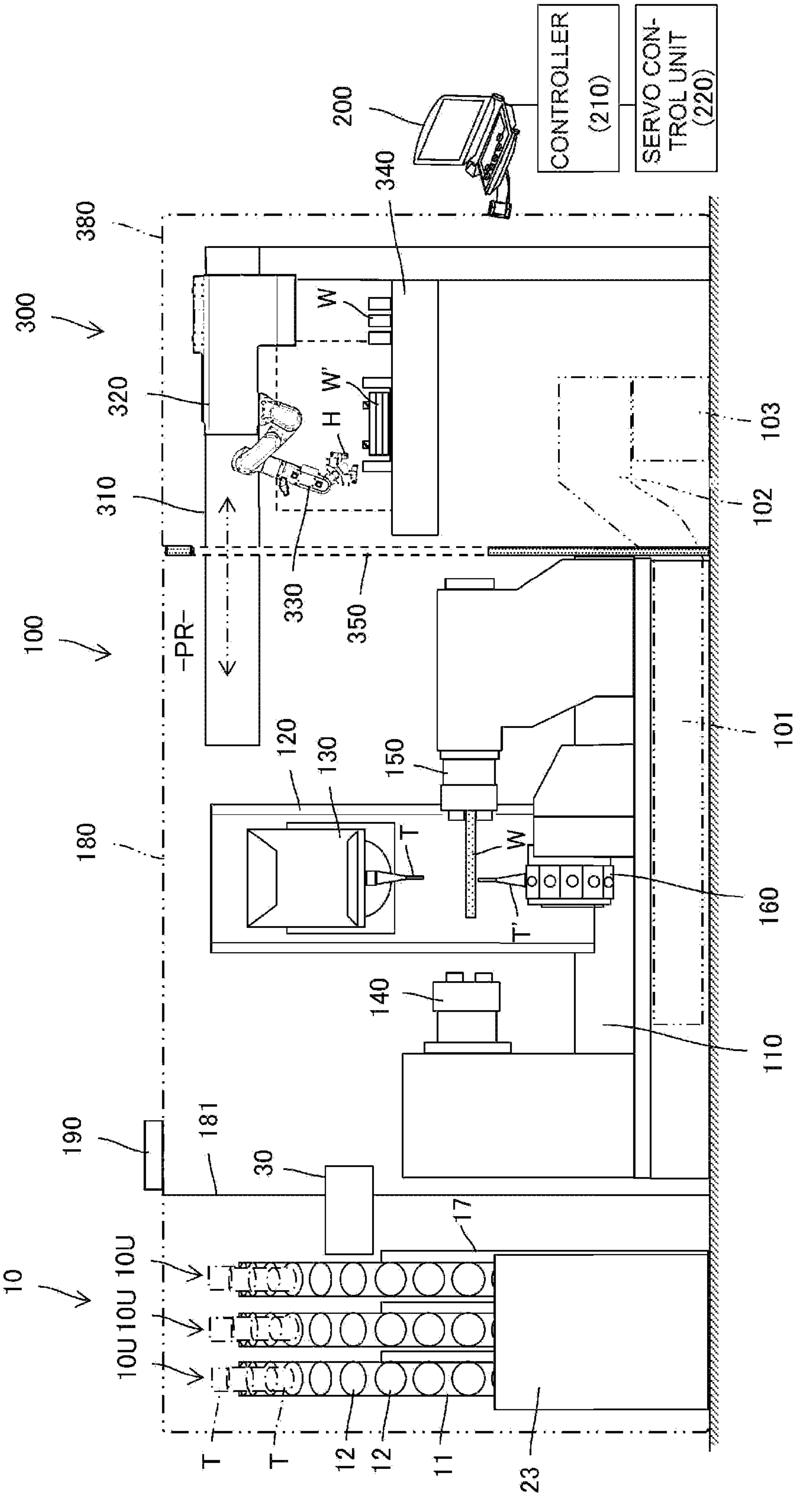
FIG. 1 An explanatory diagram of a front view of a machine tool equipped with a tool magazine device.

In the following, basic aspects and specific aspects of the tool magazine device will be described.

[Basic Aspects of Tool Magazine Device]

First, the basic concept of the present invention will be described.

The tool magazine device includes a tool transport unit in which a plurality of tool pots are disposed at predetermined intervals on the outer periphery of the tool transport unit and which is configured to circulate and transport each tool pot along a trajectory that circulates in up-and-down direction, and a chip guide disposed along a tip trajectory of a tool held in the tool pots and including a guide surface that receives and guides chips separated from the tool. The trajectory that circulates in up-and-down direction may be an annular trajectory that circulates in up-and-down direction.

Therefore, the chips separated from the tool under transportation by the tool transport unit can be received, without scattering around the floor surface, by the guide surface disposed so as to be along the tip trajectory of the tool.

The tool magazine device preferably further includes a chip container provided adjacent to the chip guide, and a cleaner that leads the chips into the chip container along the guide surface, in conjunction with the circulating and transporting of each tool pot by the tool transport unit.

Chips fallen onto the guide surface are led into the chip container along the guide surface by the cleaner moving in conjunction with the circulating and transporting of each tool pot by the tool transport unit.

The cleaner is preferably held in one of the tool pots.

By installing the cleaner in at least one of the tool pots provided in the tool transport unit, chips fallen onto the guide surface along the tip trajectory of the tool can be led into the chip container by the cleaner circulated and transported together with the tool pots.

The cleaner is preferably disposed between the tool pots adjacent to each other.

While a necessary tool is stored in the tool pots provided in the tool transport unit, chips fallen onto the guide surface along the tip trajectory of the tool can be led into the chip container by the cleaner disposed between the tool pots adjacent to each other.

The guide surface is preferably provided, as viewed in planar view, between a position corresponding to a pair of furthest protruding points in horizontal directions and a position corresponding to a lowest point in the tip trajectory of the tool held in the tool pots.

Chips fallen from the tool will accumulate, as viewed in planar view, inward from the positions corresponding to the pair of furthest protruding points in horizontal directions in the tip trajectory of the tool held in the tool pots. Therefore, by providing a guide surface in this range, the chips can be reliably received.

It is preferable that the guide surface is provided, as viewed in planar view, between a position corresponding to one of furthest protruding points in horizontal directions and a position corresponding to a lowest point in the tip trajectory of the tool held in the tool pots, and a step portion recessed downward is formed adjacent to the position corresponding to the lowest point.

Chips fallen from the tool will accumulate, as viewed in planar view, inward from the positions corresponding to a pair of furthest protruding points in horizontal directions in the tip trajectory of the tool held in the tool pots. Therefore, when the guide surface is provided between the position corresponding to one of the furthest protruding points in horizontal directions and the position corresponding to the lowest point, the chips guided by the guide surface will be collectively accumulated in the step portion formed adjacent to the position corresponding to the lowest point. As a result, the collecting work can be eased.

The tool transport unit preferably includes a plurality of disks in which the plurality of tool pots are disposed at predetermined intervals on the outer periphery such that the tool is oriented radially outward, and the plurality of disks are disposed overlappingly with each other in the rotational axis direction.

When the tool transport unit is configured with a plurality of disks disposed overlappingly with each other in the rotational axis direction, the chip guide acts suitably to reduce the load of the chip cleaning work.

[Specific Aspects of Tool Magazine Device]

Specific aspects of the tool magazine device 10 according to the present invention will be described below.

FIG. 1 shows an example of a machine tool equipped with a tool magazine device 10 to which the present invention is applied.

The machine tool 100 is composed of a 5-axis multi-tasking machine, and includes a tool spindle 130 movable up and down and right and left, on the sheet of the drawing, along a column 120 provided on a bed 110, a first spindle 140 that holds a workpiece, and a second spindle 150 movable right and left disposed opposite to the first spindle 140, and a tool rest 160.

The column 120 including the tool spindle 130 is configured to be movable right and left along the bed 110. The tool rest 160 is disposed so as to face the tool spindle 130 between the first spindle 140 and the second spindle 150 and is configured to be movable up and down and right and left. The internal space partitioned by a cover body 180 serves as a machining chamber PR.

The tool magazine device 10 is provided on the left side of the machine tool 100. A tool T, which may be any one selected from those stored in the tool magazine device 10, is attached to the tool spindle 130 in a changeable manner via an automatic tool changer 30.

An operation panel 200 is provided outside the cover body 180, and the operation panel 200 is connected with a controller 210, such as an NC program memory and an NC device, via a communication cable. The NC device is connected with a servo control unit 220 for servo driving the tool spindle 130, the first spindle 140, the second spindle 150, the tool rest 160, etc. of the machine tool 100.

A coolant nozzle is disposed in the vicinity of the tool spindle 130 and the tool rest 160, and during machining of a workpiece W which is a workpiece to be processed, a coolant is ejected toward a portion to be machined of the workpiece W held by the first spindle 140 or the second spindle 150. On the upper surface of the cover body 180, a mist collector 190 is disposed which collects a mist of coolant generated at the ejection and floating in the machining space, together with air. Although not shown in FIG. 1, on the front of the cover body 180, a door which is openable and closable is disposed.

The servo control unit 220 is driven by execution of an NC program by the NC device. The servo control unit 220 controls the tool spindle 130 to move up and down and right and left, controls the second spindle 150 to move right and left, and controls the tool rest 160 to move in up and down and right and left. The servo control unit rotationally controls the tool T held by the tool spindle 130, the tool held by the tool rest 160, the first spindle 140, and the second spindle 150.

The work W held by a holding mechanism provided at the tip of the first spindle 140 or the second spindle 150 is cut with the tool T held by the tool spindle 130 or a tool held by the tool rest 160, and then, the workpiece W transferred and held by a holding mechanism provided at the tip of the second spindle 150 or the first spindle 140 is cut by a tool held by the tool spindle 130 or the tool held by the tool rest 160. As the holding mechanism, a known chuck mechanism or the like is used. The cutting work is performed, in some cases, on the workpiece W while being held both the first spindle 140 and the second spindle 150, with the tool held by the tool spindle 130 or the tool held by the tool rest 160.

A work stocker 300 is provided on the right side of the machine tool 100. A cover body 380 is provided around the work stocker 300 for safety management, and a workpiece placing table 340 on which a work W before machining and a work W' after machining are placed is provided.

In the work stocker 300, an articulated robot 330 at the end of which a hand H for holding the workpiece W is attached is disposed, and a support 320 of the articulated robot 330 is attached in a movable manner along a horizontal guide plate 310 as shown by the arrow.

A door 350 that partitions the machining space is provided in the walls opposing each other of the cover body 180 of the machine tool 100 and the cover body 380 of the work stocker 300. The door 350 is configured to be opened when the workpiece W is loaded into the machine tool 100 and when the workpiece W' is unloaded from the machine tool 100, and to be closed during machining of the workpiece W in the machine tool 100. The opening or closing of the door 350 and the operation of the articulated robot 330 are controlled by the controller 210 and the servo control unit described above.

Below the bed 110, a coolant recovery tank 101 for recovering a coolant dripping within the machining chamber PR is disposed, so that chips generated during machining are collected together with the coolant, into the coolant recovery tank 101. A chip conveyor 102 is disposed at the bottom of the coolant recovery tank 101, so that the chips collected in the coolant recovery tank 101 are carried out of the machine by a chip conveyor 102 and collected in a collecting container 103.

The above-described tool magazine device 10 is provided inside the cover body 180, and, except the automatic tool changer 30 which serves as a delivery unit for delivering the tool T to and from the tool spindle 130, is partitioned by a partition wall 181 from the machining chamber PR, so that the chips and the mist generated during machining will not scatter around.

The tool magazine device 10 includes three tool magazine units 10U installed side by side, and each tool magazine unit 10U includes an annular tool transport unit 11 and a plurality of tool pots 12 provided on the outer periphery of the tool transport unit 11. Although the tool T is stored in only some of the tool pots 12 in FIG. 1, the same or different kinds of tools T may be stored in respective tool pots 12, depending on the frequency of use.

A chip container 23 is provided on the front side and the back side of the tool magazine units 10U, and configured such that chips attached to the tool T is contained in the chip container 23.

Figure 2A:
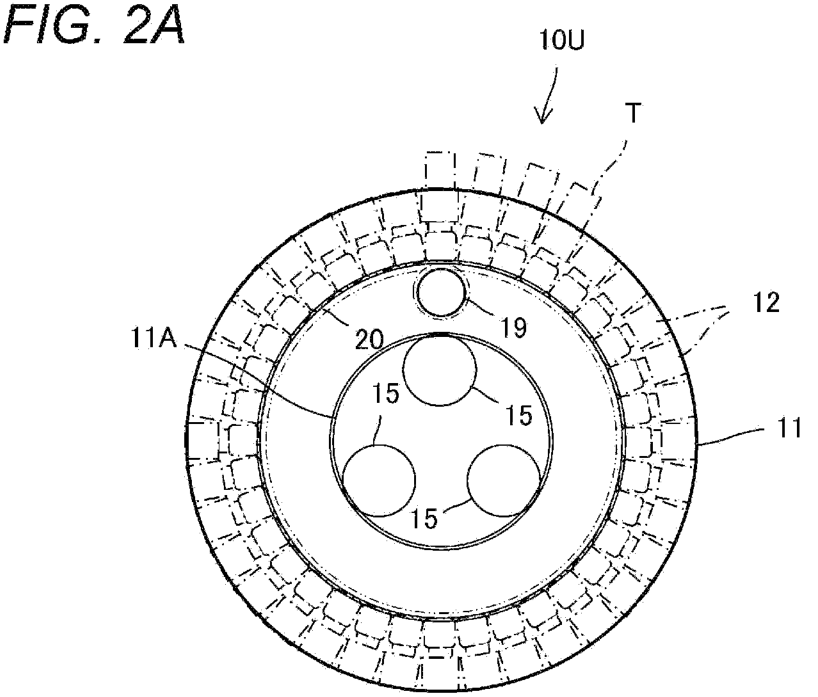
FIG. 2A An explanatory diagram of a support mechanism of the tool magazine device.
Figure 2B:
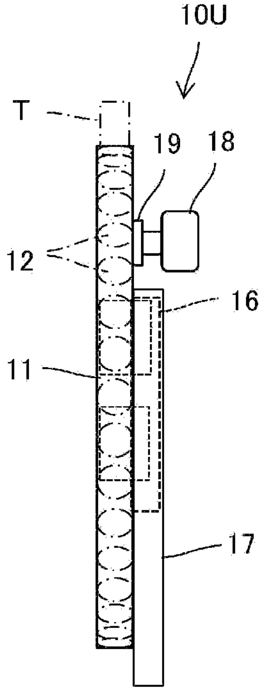
FIG. 2B An explanatory diagram of the support mechanism of the tool magazine device.

FIGS. 2A and 2B illustrate examples of a support mechanism and a rotational drive mechanism of the tool magazine unit 10U. The tool transport unit 11, which is formed in a perfect circular shape when viewed from the left side in FIG. 1, has a flange 11A formed at an edge portion that is circularly hollowed out in the center. Three cylindrical support members 15 are evenly arranged at a center angle of 120 degrees so as to be inscribed in the flange 11A, and each support member 15 is supported by a holder 16 provided on a support frame 17 so as to be freely rotatable.

A gear portion 20 protruding more inward toward the center than the support positions of the tool pots 12 which are disposed at predetermined intervals on the outer periphery of the tool transport unit 11 is formed. When a gear 19 engaged with the gear portion 20 is driven by a motor 18, the tool transport unit 11 supported by the support members 15 is driven to rotate forward or backward.

Three tool magazine units 10U are installed side by side each of which is equipped with the support mechanism and the rotation drive mechanism as above and which are independently rotatably driven in both forward and reverse directions.

Note that the number of tool magazine units 10U included in the tool magazine device 10 is not limited to three, but may be four or more, or may be only one. Furthermore, the support mechanism and rotational drive mechanism of the tool transport unit 11 described above are merely examples, and the present invention is not limited to this configuration.

In the above-described tool magazine unit 10U, the tool transport unit 11 is formed into a perfect circle as viewed in planar view, but the tool transport unit 11 may not be necessarily configured in a perfect circle as viewed in planar view, and may be configured in an elliptical or oblong shape. In that case, the tool transport unit 11 is configured with a chain mechanism so that the tool pots 12 move along a preset elliptical orbit or an elliptical orbit, and the chain mechanism is rotationally driven by a sprocket driven by a motor.

In other words, it suffices that the tool transport unit 11 is configured such that a plurality of tool pots 12 are disposed at predetermined intervals on the outer periphery, and each tool pot 12 is circulated and transported along a trajectory that circulates in up-and-down direction.

The rotational drive of the tool transport unit 11 and the tool changing operation by the automatic tool exchanger 30 are controlled by the aforementioned controller 210.

Figure 3:
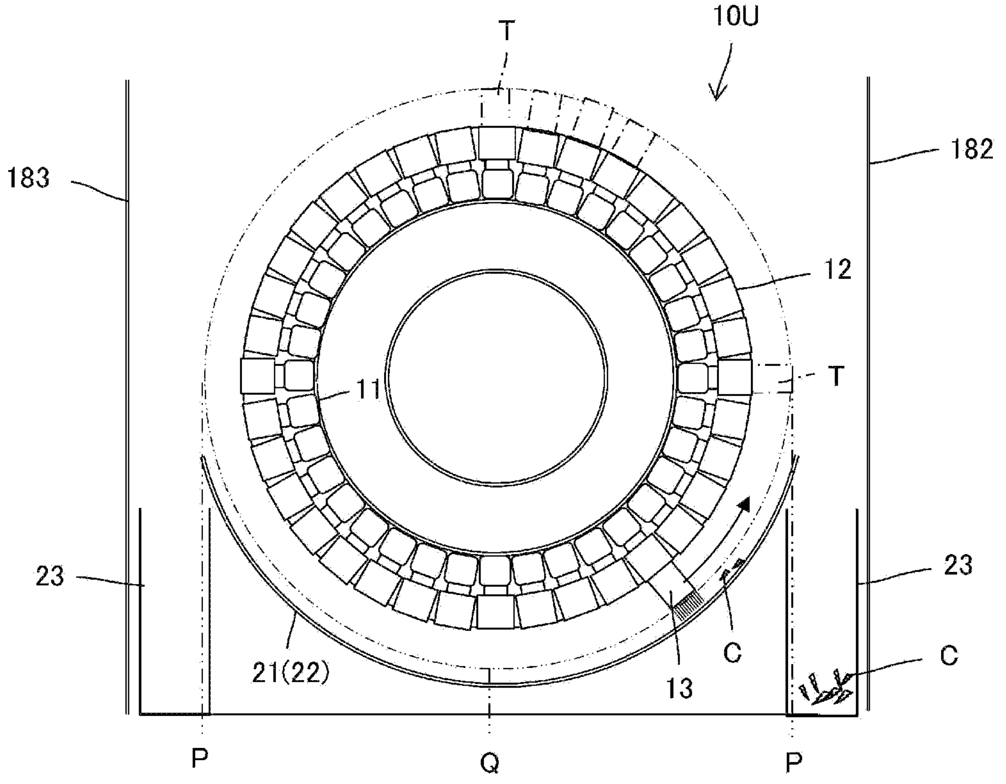
FIG. 3 An explanatory diagram of a side view of the tool magazine device.
Figure 4:
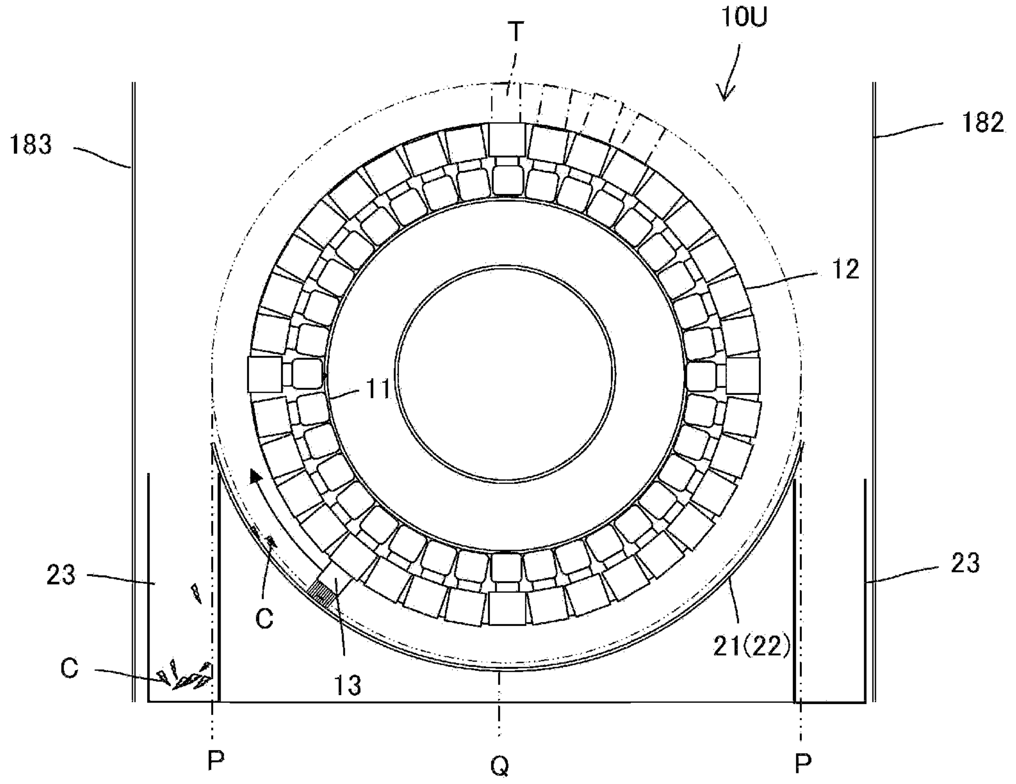
FIG. 4 An explanatory diagram of a side view of the tool magazine device.

As illustrated in FIGS. 3 and 4, the tool magazine device 10 is provided with a chip guide 21 including a guide surface 22, which is arranged so as to move along a tip trajectory (indicated by a dash-dot-dot line in FIG. 3) of the tool T held in the tool pots, specifically, which is arranged with a clearance such that the tip of the tool T does not come into contact therewith. In order to eliminate the necessity of complicated cleaning work that would become necessary if chips C separated from the tool T under transportation by the tool transport unit 11 scatter around the floor surface and accumulate thereon, after the tool T has returned to the tool pot 12 upon machining, the chips C having adhered to the tool T and fallen therefrom after returned are received by the guide surface 22.

The guide surface 22 is provided, as viewed in planar view, between a position corresponding to a pair of furthest protruding points P in horizontal directions and a position corresponding to a lowest point Q in the tip trajectory of the tool T held in the tool pots 22. In the figure, the guide surface 22 is formed in an arc shape along the tip trajectory of the tool T, but may not be necessarily an arc shape, and a plate-like member may be bent in multiple stages along the tip trajectory of the tool T.

The guide surface 22 provided on the chip guide 21 is preferably configured separately corresponding to each tool magazine unit 10U, but may be configured integrally in the direction in which the tool magazine units 10U are disposed overlappingly.

A chip container 23 is installed at an end of the guide surface 22, and a cleaner 13 is accommodated in one of the tool pots 12 provided in the tool transport unit 11. The chips C fallen onto the guide surface 22 are swept out into the chip container 23 by the cleaner 13 that moves along with the rotation of the tool transport unit 11. In order to shorten the time required for tool changing, the rotation direction of the tool transport unit 11 is determined to be a direction in which the relative distance between the position of the tool pot 12 containing the tool T to be replaced and the position of the automatic tool changer 30 is short.

In FIG. 3, when the tool transport unit 11 rotates counterclockwise, the chips C are swept out into the chip container 23 on the right side. In FIG. 4, when the tool transport units 11 rotates clockwise, the chips C are swept out into the chip container 23 on the left side. The chips C fallen onto the guide surface 22 are not always swept out into the chip container 23 by the rotation of the tool transport unit 11 for tool changing performed once. Therefore, by periodically driving the tool transport unit 11 to rotate at times other than the tool changing time, it is also possible to control the chips C to be reliably swept out into the chip container 23. Further, a plurality of the cleaners 13 may be attached at intervals to the tool pots 12.

The cleaner 13 may be a cleaner brush including a rod-like member made of metal that can be accommodated in the tool pots 12, and a brush provided at the tip of the rod-like member. The cleaner brush is preferably configured to be able to be accommodated in the tool pots 12, but other than being accommodated in the tool pots 12, may be detachably mounted at any of the positions of the tool transport unit 11. For example, the cleaner brush may be fixedly or detachably mounted between the tool pots 12 adjacent to each other.

Figure 5A:
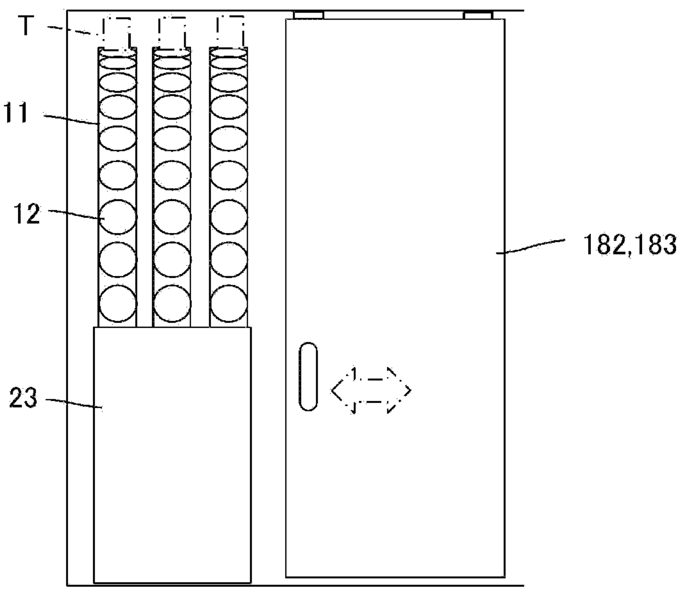
FIG. 5A An explanatory diagram of a front view of the tool magazine device.
Figure 5B:
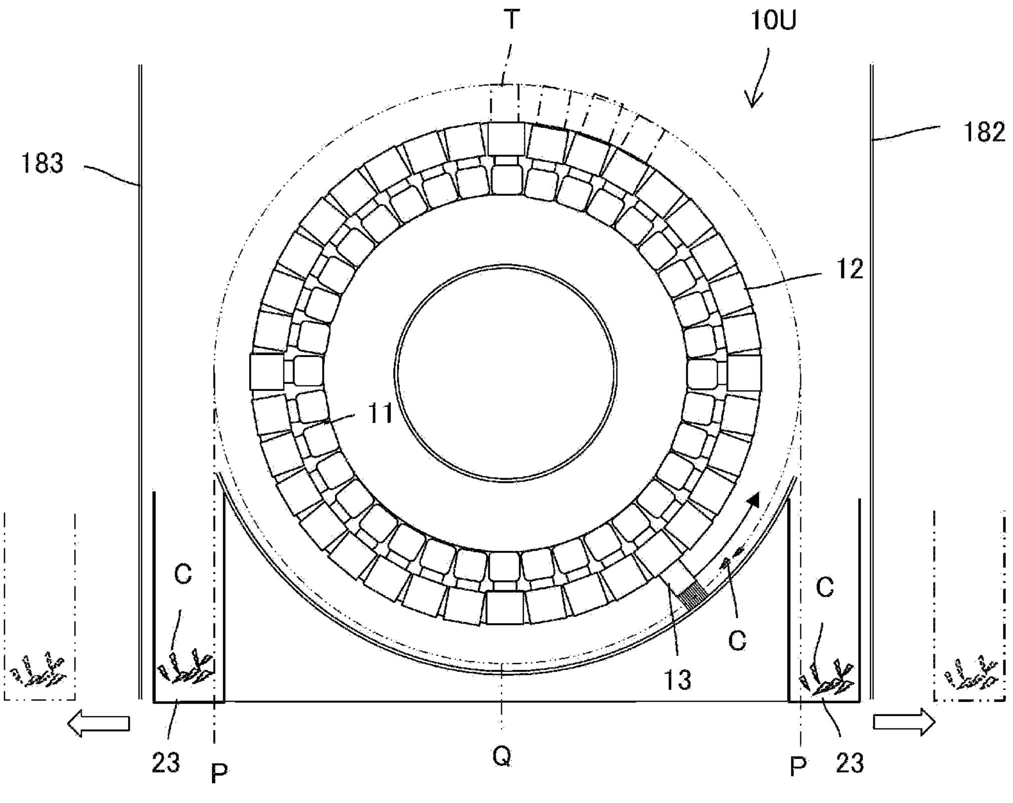
FIG. 5B An explanatory diagram to show how a chip container is taken out from the tool magazine device.

As shown in FIGS. 5A and 5B, of the cover body 180, on the front side and back side of the tool magazine device 10, sliding doors 182 and 183 are provided. By opening the sliding doors 182 and 183, the chip container 23 in which the chips have been swept thereinto is taken outside from the cover body 180 and collected. This frees the operator from complicated cleaning work.

Figure 6:
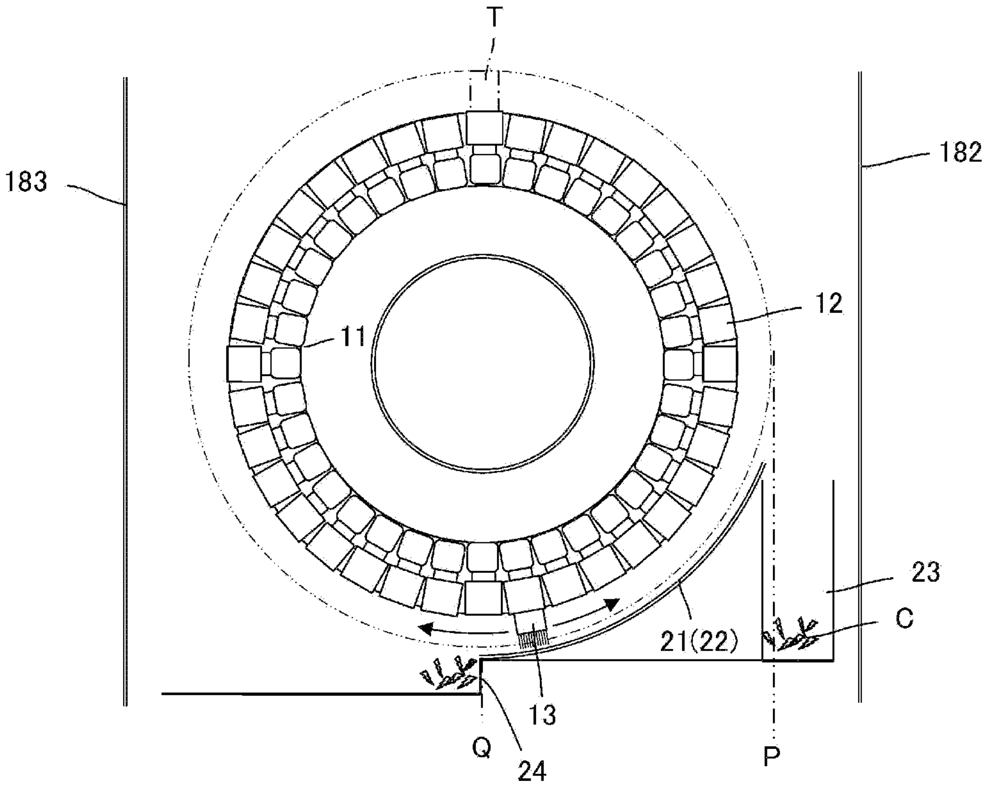
FIG. 6 An explanatory diagram of a side view of another embodiment of the tool magazine device.

Another embodiment of the chip guide 21 is shown in FIG. 6. In this example, the guide surface 22 is provided, as viewed in planar view, between a position corresponding to one of furthest protruding points P in horizontal directions and a position corresponding to a lowest point Q in the tip trajectory of the tool T, and a step portion 24 recessed downward is formed adjacent to the position corresponding to the lowest point Q.

When the guide surface 22 is provided between a position corresponding to one of the furthest protruding points P and a position corresponding to the lowest point Q, the chips C guided by the guide surface 22 will be accumulated at the step portion 24 formed adjacent to the position corresponding to the lowest point Q, and this eases the collecting work. In this example, by keeping the sliding door 183 open, the tip of a vacuum cleaner can be easily brought close to the step portion 24, and the cleaning work can be performed.

The step portion 24 may be formed anywhere between the position corresponding to the lowest point Q and the door 183.

Figure 7:
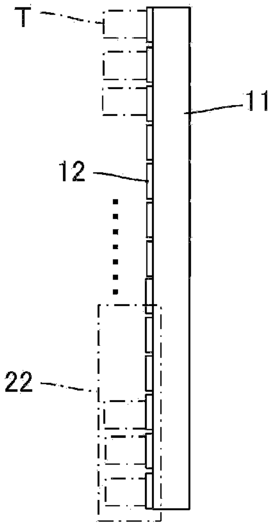
FIG. 7 An explanatory diagram of a front view of another embodiment of the tool magazine device.

Although in the above-mentioned tool transport unit 11, an example configured to include a plurality of the tool pots 12 on the outer periphery of a disc-shaped rotating body so that the tool T is directed outward in the radial direction is described, the tool pots 12 may be disposed so as to be oriented in a direction perpendicular to the rotating surface at the outer peripheral portion of the disc-shaped rotating body that constitutes the tool transport unit 11 (FIG. 7). In this case as well, the guide surface 22 is provided, as viewed in planar view, between a position corresponding to one of furthest protruding points in horizontal directions and a position corresponding to the lowest point in the tip trajectory of the tool T held in the tool pots 12.

Although in the above-described embodiments, an example in which the machine tool 100 is composed of a 5-axis multi-tasking machine, but the tool magazine device 10 according to the present invention can also be applied to a machine tool other than 5-axis multi-tasking machines. Any tool magazine device 10 equipped with a tool transport unit in which a plurality of tool pots are disposed at predetermined intervals on the outer periphery and which is configured to circulate and transport each pot along a trajectory that circulates in up-and-down direction is applicable to other types or models of multi-tasking machines, and also applicable to a machining center including a vertical machining center, a horizontal machining center, etc.

Although embodiments and aspects of the present invention are described above, the disclosed contents may be altered in the details of the configuration, and changes in combination of elements, sequence, and the like in the embodiments and aspects can be implemented without departing from the scope and spirit of the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

As described above, according to the present invention, it is possible to realize a tool magazine device that can easily collect chips and the like separated from the tool stored in the tool magazine.

REFERENCE NUMERALS

10: tool magazine device
10U: tool magazine unit
11: tool transport unit
12: tool pot
13: cleaner
21: chip guide
22: guide surface
23: chip container
30: automatic tool changer
100: machine tool
182,183: sliding door
C: chips

What is claimed is:

1. A tool magazine device, comprising:

a tool transport unit in which a plurality of tool pots are disposed at predetermined intervals and which is configured to circulate and transport each tool pot;

a chip guide including a guide surface that receives and guides chips separated from a tool;

a chip container provided adjacent to the chip guide; and a cleaner that leads the chips into the chip container along the guide surface, in conjunction with the circulating and transporting of each tool pot by the tool transport unit, wherein the cleaner is transported by the tool transport unit.

2. The tool magazine device according to claim 1, wherein in the tool transport unit, the plurality of tool pots are disposed at the predetermined intervals on an outer periphery of the tool transport unit, and the each tool pot is circulated and transported along a trajectory that circulates in up-and-down direction, and the chip guide is arranged along a tip trajectory of the tool held in the tool pots.

3. The tool magazine device according to claim 2, wherein the trajectory that circulates in up-and-down direction is an annular trajectory that circulates in up-and-down direction.

4. The tool magazine device according to claim 1, wherein the guide has an upper end and a lower end and the chip guide further comprises a step portion recessed downward from the lower end.

5. The tool magazine device according to claim 1, wherein the cleaner is held by one of the tool pots.

6. The tool magazine device according to claim 1, wherein the cleaner is disposed between two adjacent tool pots of the plurality of tool pots.

7. The tool magazine device according to claim 1, wherein the tool transport unit includes a plurality of disks in which the plurality of tool pots are disposed at predetermined intervals on the outer periphery such that the tool is oriented radially outward, and the plurality of disks are disposed overlappingly with each other in a rotational axis direction.

* * * * *